(12) United States Patent
Hull et al.

(10) Patent No.: US 10,399,684 B2
(45) Date of Patent: Sep. 3, 2019

(54) INDUCTION HEATING COILS WITH UNIFORM HEATING

(71) Applicant: The Boeing Company, Chicago, IL (US)

(72) Inventors: John R. Hull, Seattle, WA (US); Vyacheslav Khozikov, Bellevue, WA (US); Robert J. Miller, Fall City, WA (US); Stephen R. Amorosi, Seattle, WA (US); Rangasamy Elangovan, Bothell, WA (US)

(73) Assignee: The Boeing Company, Chicago, IL (US)

( * ) Notice: Subject to any disclaimer, the term of this patent is extended or adjusted under 35 U.S.C. 154(b) by 886 days.

(21) Appl. No.: 14/526,972

(22) Filed: Oct. 29, 2014

(65) Prior Publication Data

US 2016/0122025 A1  May 5, 2016

(51) Int. Cl.

| | |
|---|---|
| *H05B 6/10* | (2006.01) |
| *B64D 15/12* | (2006.01) |
| *H05B 6/04* | (2006.01) |
| *H05B 6/36* | (2006.01) |
| *H05B 6/38* | (2006.01) |
| *H05B 6/40* | (2006.01) |
| *H05B 6/44* | (2006.01) |

(52) U.S. Cl.
CPC ............. *B64D 15/12* (2013.01); *H05B 6/04* (2013.01); *H05B 6/105* (2013.01); *H05B 6/36* (2013.01); *H05B 6/38* (2013.01); *H05B 6/40* (2013.01); *H05B 6/44* (2013.01); *H05B 2214/02* (2013.01)

(58) Field of Classification Search
CPC ........ B64D 15/12; B29C 66/71; H05B 6/105; H05B 6/36
USPC .......................................... 219/619, 633, 634
See application file for complete search history.

(56) References Cited

U.S. PATENT DOCUMENTS

| | | | | | |
|---|---|---|---|---|---|
| 3,704,357 | A | * | 11/1972 | Moulin .................. | B23K 1/002 219/615 |
| 3,941,641 | A | * | 3/1976 | Heller, Jr. ............. | B29C 66/712 156/272.2 |
| 5,400,984 | A | * | 3/1995 | Arnold ................... | B64D 15/04 244/134 B |
| 5,904,322 | A | * | 5/1999 | Giamati ................. | B64D 15/12 244/134 B |

(Continued)

FOREIGN PATENT DOCUMENTS

JP          H1027681 A          1/1998

*Primary Examiner* — Dana Ross
*Assistant Examiner* — Lawrence H Samuels
(74) *Attorney, Agent, or Firm* — Felix L. Fischer (57) ABSTRACT

An induction heating system employs a ferromagnetic susceptor mounted proximate an exterior of flight surface of an aircraft. At least one electrically conductive coil is mounted proximate the ferromagnetic susceptor. The at least one electrically conductive coil is powered by a first power source with a first frequency. At least one compensating coil is mounted proximate the ferromagnetic susceptor having a geometry determined to provide substantially net-zero flux with respect to the at least one electrically conductive coil and positioned to induce induction heating where the first plurality of electrically conductive coils lacks induced inductive heating coverage. The at least one compensating coils is powered by a second AC power source with a second frequency.

20 Claims, 9 Drawing Sheets

(56) References Cited

U.S. PATENT DOCUMENTS

| | | | | |
|---|---|---|---|---|
| 6,338,455 | B1* | 1/2002 | Rauch | B64D 15/12 244/134 D |
| 6,349,637 | B1* | 2/2002 | Molteni | D21G 1/0053 100/153 |
| 7,146,116 | B2* | 12/2006 | Nonaka | H03K 17/082 399/33 |
| 7,913,952 | B2* | 3/2011 | Boschet | B64D 15/12 244/134 D |
| 9,469,408 | B1* | 10/2016 | Elangovan | B64D 15/12 |
| 2005/0275497 | A1* | 12/2005 | Ramadan | H01F 5/003 336/200 |
| 2008/0063025 | A1* | 3/2008 | Fishman | H05B 6/067 373/144 |
| 2008/0251642 | A1* | 10/2008 | Boschet | B64D 15/12 244/134 D |
| 2009/0114640 | A1* | 5/2009 | Nadot | H05B 6/067 219/634 |
| 2009/0255922 | A1* | 10/2009 | Chirico | D21G 1/028 219/619 |
| 2010/0155538 | A1* | 6/2010 | Calder | B64D 15/12 244/134 D |
| 2011/0049300 | A1* | 3/2011 | Safai | B64D 15/12 244/134 D |
| 2011/0139769 | A1* | 6/2011 | Miller | B29C 73/30 219/634 |
| 2013/0140298 | A1* | 6/2013 | Uchida | H01L 21/67109 219/634 |

* cited by examiner

INDUCTION HEATING COILS WITH UNIFORM HEATING

REFERENCES TO RELATED APPLICATIONS

This application is copending with U.S. application Ser. No. 14/195,091 filed on Mar. 3, 2014 entitled SYSTEMS AND METHODS FOR PREDICTING AND CONTROLLING ICE INFORMATION, now U.S. Pat. No. 9,463,879 having an issue date of Oct. 11, 2016 and having a common assignee with the present application, the disclosure of which is incorporated herein by reference.

BACKGROUND INFORMATION

Field

Embodiments of the disclosure relate generally to aircraft icing prevention systems and more particularly to embodiments for coil geometries for an induction-heating system employing a pair of coils connected to a first power system and a third coil connected to a second power system that produces uniform heating in a susceptor sheet. The geometry of the coils is determined to provide a null-flux linkage between the coil pair and the third coil resulting in minimal coupling between the two power systems.

Background

An induction-heating anti-icing system for aircraft use typically incorporates a ferromagnetic susceptor, one or more heating coils, and a power supply to provide AC current to the coils. For wing leading edge heating, the susceptor is either included in the erosion shield of the wing leading edge or is placed immediately behind, and in good thermal contact with, the erosion shield. The heating coils are placed immediately behind the susceptor. When AC current flows in the coils, the magnetic field produced by the coils is inductively coupled into the ferromagnetic susceptor. With a changing magnetic flux in the susceptor, electrical currents are induced in the susceptor, and because the susceptor has electrical resistivity, Joule heating results in the susceptor. When the areal thermal power of Joule heating within the susceptor is larger than the heat transfer from the susceptor to the ambient surroundings, the temperature of the susceptor rises. The induction-heating concept has several advantages in anti-icing systems. Electrically, it is very efficient, and the heat is deposited immediately into the component of the vehicle on which it is desired to keep ice from forming. It also offers a system that is easy to install and requires few, if any, fasteners.

The design constraints for induction-heating systems on vehicles promote the use of flat coils, such as a spiral pancake. The coil will typically follow the contour of the susceptor, which in turn is contoured to follow the profile of the surface on which ice protection is desired such as a wing leading edge, or nose cowl of the engine nacelle. The geometry of the spiral pancake will always result in an area in which the tangential component of the magnetic field is a minimum. This field minimum occurs because the current flow in the filaments on either side of this area is in opposite directions, and the magnetic field produced by these current flows cancels at the center of the coil. In a circular spiral pancake, the field minimum is at the inner origin of the spiral. For an elongated ellipsoidal spiral, the field minimum occurs along a line segment in the middle of the coil. The area on the susceptor that is adjacent to the field minimum on the coil will be heated much less than the rest of the susceptor. The normal component of the incident magnetic field produces minimal heating in the susceptor. Further, the heat transfer on the vehicle is such that it is predominantly transverse to the thickness of the susceptor. In addition, the susceptor thickness is small. Thus, there is negligible heat transfer within the susceptor from parts of the susceptor where the magnetic field is substantial to the part of the susceptor where the magnetic field is at a minimum.

Due to these physical operational conditions, there will always be a relative cold spot on the susceptor. The current through the entire coil must be sufficient to keep this spot above a temperature at which ice will form. This current is much more than required to keep other parts of the susceptor above the ice-forming temperature, and thus, the induction-heating will be less efficient than it would be if all parts of the susceptor were heated just enough to keep it above the ice-forming temperature. In addition, parts of the susceptor that have the largest amount of heating have the potential to attain a temperature high enough to thermally damage the structure of the vehicle that is in proximity to the susceptor.

It is therefore desirable to provide a structural induction heating system which eliminates geometry induced cold spots to allow more even heating of the susceptor in an icing protection system.

SUMMARY

Exemplary embodiments provide an induction heating system employing a ferromagnetic susceptor mounted proximate an exterior of flight surface of an aircraft. At least one electrically conductive coil is mounted proximate the ferromagnetic susceptor. The at least one electrically conductive coil is powered by a first power source with a first frequency. At least one compensating coil is mounted proximate the ferromagnetic susceptor having a geometry determined to provide substantially net-zero flux with respect to the at least one electrically conductive coil and positioned to induce induction heating where the first plurality of electrically conductive coils lacks induced inductive heating coverage. The at least one compensating coils is powered by a second AC power source with a second frequency.

A method to provide uniform induction heating for deicing and anti-icing flight surfaces on an aircraft is provided by the disclosed embodiments wherein a ferromagnetic susceptor is provided proximate an exterior of flight surfaces of an aircraft. A first plurality of electrically conductive coils is mounted proximate the ferromagnetic susceptor to inductively heat the ferromagnetic susceptor. At least one compensating coil is mounted proximate the ferromagnetic susceptor having a geometry determined to provide substantially net-zero flux with respect to the at least one electrically conductive coil and positioned to induce induction heating where the first plurality of electrically conductive coils lacks induced inductive heating coverage.

BRIEF DESCRIPTION OF THE DRAWINGS

The features, functions, and advantages that have been discussed can be achieved independently in various embodiments of the present disclosure or may be combined in yet other embodiments, further details of which can be seen with reference to the following description and drawings.

DETAILED DESCRIPTION

The embodiments described herein provide a coil geometry that provides uniform heating over the entire susceptor. Example embodiments employ a coil pair, wired in series to provide maximum heating along the nose line of the leading edge. Induction heating of the susceptor by each coil has a cold spot at a location away from the leading edge. A compensating coil is superposed over the coil pair with a relative geometry defined for null flux linkage to the coil pair and providing heat to the susceptor at the cold spots of the coil pair. The compensating coil is powered by a power supply independent from the power supply that powers the coil pair. The geometry of the compensating coil is predetermined to provide that net magnetic flux from the coil pair that links to the compensating coil is essentially zero. This geometry is a net-zero flux coupling, and the mutual inductance between the coil pair and the compensating coil is negligible. By symmetry, the total voltage induced on the coil pair by the magnetic flux emanating from the compensating coil is essentially zero. In this way, the two independent power supplies do not interfere with each other. Spiral pancakes or toroidally wound segmented solenoids, as might be found in anti-icing systems for the nose cowl of an engine nacelle may be employed for the coils.

Figure 1A:
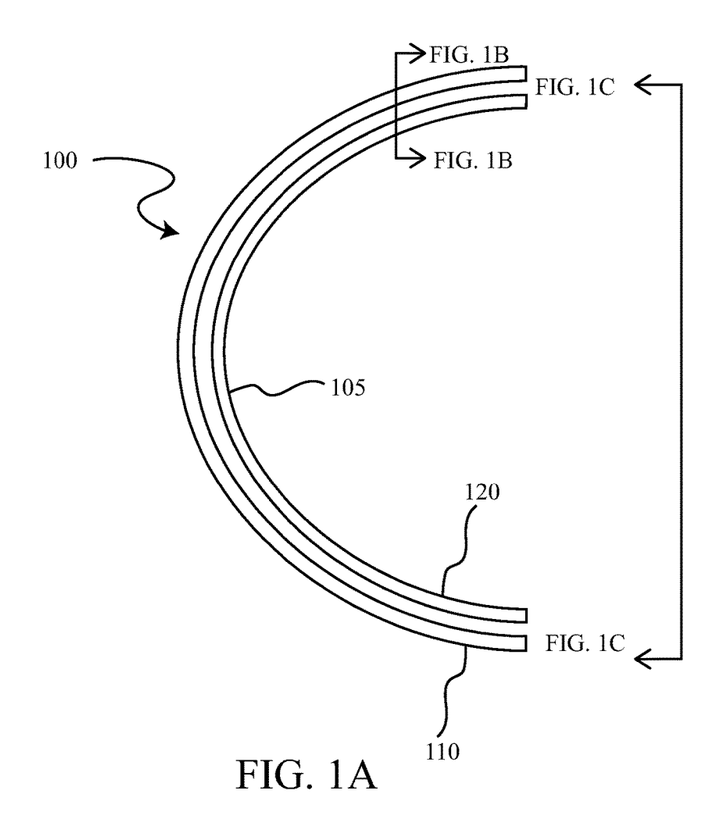
FIG. 1A is a side section view of an induction heating system susceptor and coils on a wing leading edge.
Figure 1B:
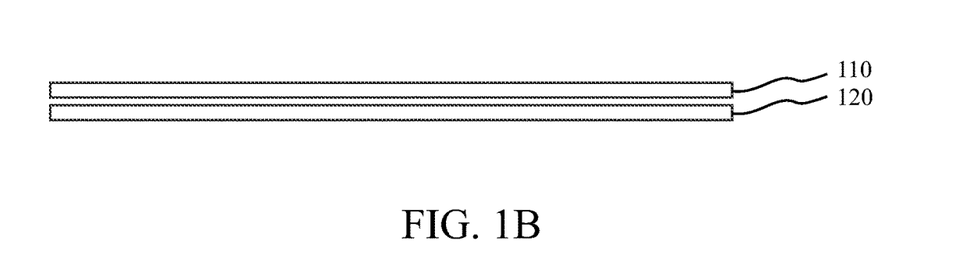
FIG. 1B is a spanwise partial section view along lines FIG. 1B-FIG. 1B in FIG. 1A.
Figure 1C:
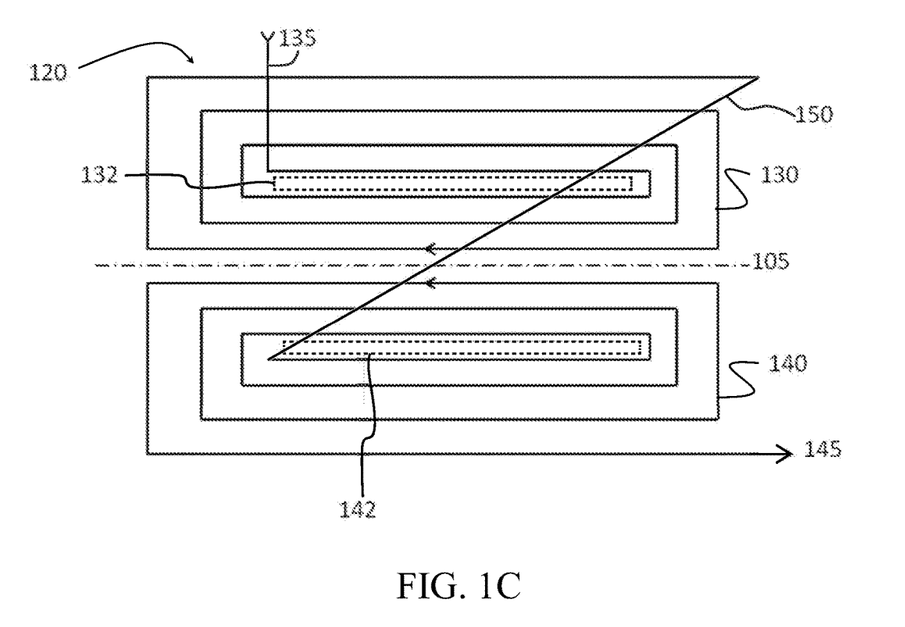
FIG. 1C is a rear view of the induction heating system of FIG. 1A.

Referring to the drawings, a side cross section of a susceptor and heating coil pair is shown in FIG. 1A in a typical configuration for an anti-icing application for a wing leading edge. The direction of the vehicle motion would typically be toward the left in FIG. 1A. Induction-heating system 100 has a susceptor 110 and heating coil pair 120. The susceptor 110 may be a metallic or metal alloy sheet. A leading-edge nose line is indicated by element 105. Susceptor 110 follows the profile of the wing leading edge. A section view as represented by lines FIG. 1B-FIG. 1B in FIG. 1A of an upper segment of system 100 is shown in FIG. 1B, demonstrating that the profile extends into the page, as it would along a portion of the length of the wing. As best seen in a rear view of the heating coil pair 120 along lines FIG. 1C-FIG. 1C in FIG. 1B, the coil pair 120 includes an upper coil 130 and a lower coil 140. Upper coil 130 has current lead 135; and lower coil 140 has current lead 145. The arrows show the relative direction of current flow at a given instant of time. The upper and lower coils are electrically connected by lead 150 such that both coils have current in the same direction along nose line 105. Inductive heating of the susceptor by upper coil 130 will result in a cold spot 132, and inductive heating of the susceptor by lower coil 140 will result in a cold spot 142. For the elongated spiral of coils 130 and 140, the field minimum occurs along a line segment in the middle of the coil. This field minimum occurs because the current flow in the filaments on either side of this area is in opposite directions, and the magnetic field produced by these current flows cancels at the center of the coil. For the embodiment shown, the pair of coils take the form of an elongated pair of spiral pancake coils with square corners. The number of windings in the figure is sparse for better visualization. The spiral shape and number of windings may vary in actual embodiments as required to provide the desired inductive heating of the susceptor.

Figure 2A:
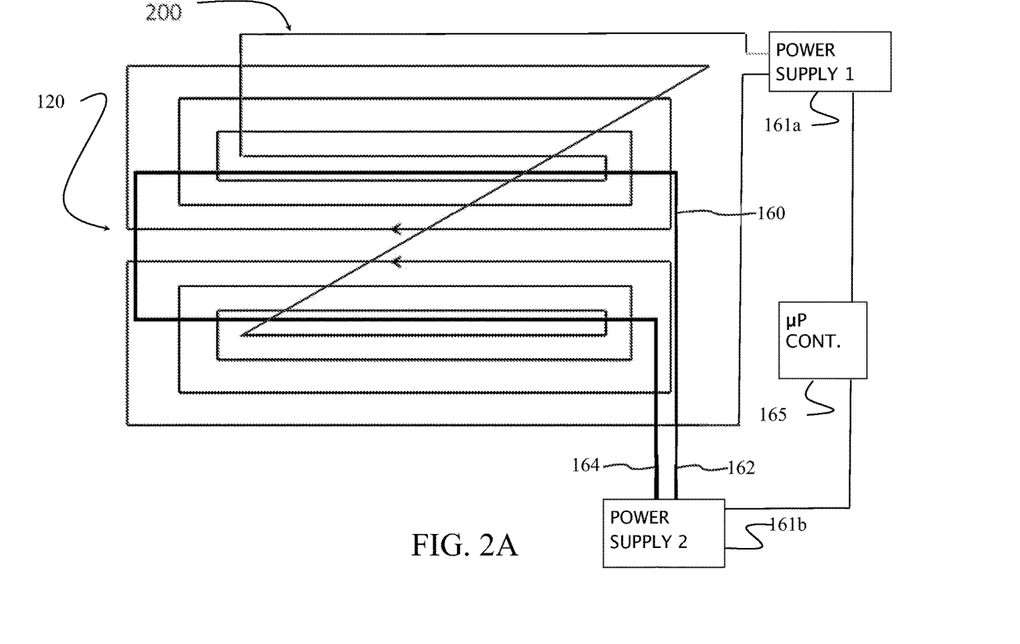
FIG. 2A is a schematic view of a pair of induction heating coils with a compensating coil for uniform heating and associated power sources.
Figure 2B:
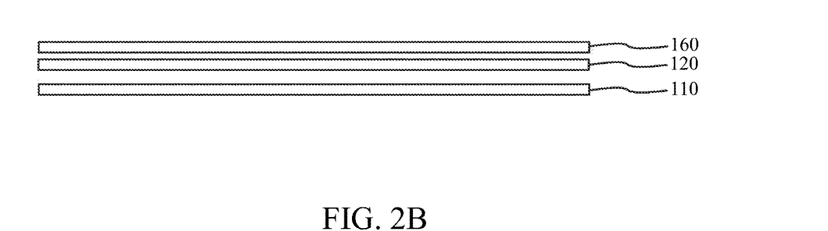
FIG. 2B is a section view of the induction heating coil pair and compensating coil of FIG. 2A.

The basic configuration of an exemplary embodiment of the inductive heating coils with uniform heating is shown in FIGS. 2A and 2B. Induction heating system 200 incorporates the elements of induction-heating system 100 depicted in FIGS. 1A-1C, with the addition of a compensating coil, third coil 160, having current leads 162 and 164. Third coil 160 is mounted on top (inboard) of coil pair 120 for the embodiment shown, and third coil 160 is symmetric about the nose line 105, as is coil pair 120. Third coil 160 is laid over coil pair 120 with a geometrical relationship wherein the net magnetic flux linkage from coil pair 120 to third coil 160 is substantially zero; a net-zero flux or null-flux linkage condition. Third coil 160 is shown as a single turn with square corners in FIG. 2A mounted with a portion of the coil aligned over the line segment in the middle of each coil of the coil pair 120 where the field minimum occurs where current flow in the filaments on either side is in opposite directions. In alternative embodiments the third coil 160 may incorporate an arbitrary number of turns with various geometric shapes positioned to provide the net-zero flux condition relative to the coil pair 120. Similarly, the number of turns in upper and lower coils 130 and 140 can be fewer or greater than that shown in FIG. 2A. In FIG. 2A, upper and lower coils 130 and 140 are shown as symmetric about nose line 105. However, in general this is not a constraint, especially as the upper part of a wing leading edge usually has a different geometry than the lower part. Even with an unsymmetrical pair, spacing between coil filaments and the geometric path of the third coil 160 can be adjusted so that the net-zero flux linkage condition is maintained.

For the exemplary embodiment of FIGS. 2A and 2B, coil pair 120 and third coil 160 have independent power supplies 161a and 161b, and that the frequency of the two power supplies is different. In actual embodiments, the difference in frequency can be very small. If all three coils were run at the same frequency with constant phase difference, the cold spots of the coil pair would not be eliminated, but merely moved to a different location. Operating the third coil 160 at a different frequency from the coil pair 120 ensures that the average heating of the third coil is additive to the average heating of the coil pair.

Figure 2C:
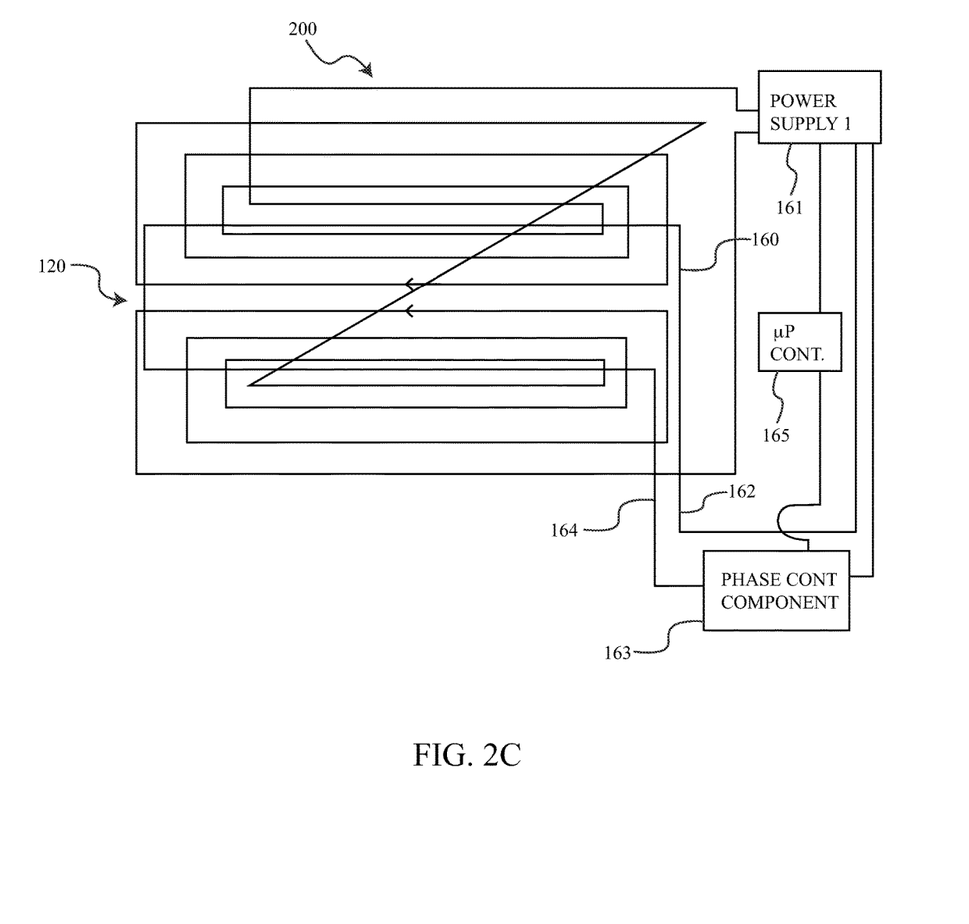
FIG. 2C is a schematic view of the induction heating coils with a compensating coil for uniform heating and alternative power source arrangement.

In an alternate embodiment shown in FIG. 2C, the coil pair 120 and third coil 160 are connected to the same power supply 161, with the coil pair 120 in parallel with the third coil 160. However, the third coil 160 has a phase adjustment component 163 that may employ a solenoid, a capacitor, or a combination thereof in the form of an electronic circuit in series with the third coil and connected to the first AC power supply 161 that provides a current phase variation for the third coil randomly in time. While the presence of the third coil 160 provides most of the improvement in heating uniformity, compared to a coil pair alone, heating uniformity can be improved further by adjusting the filament spacing in both the horizontal and vertical directions in FIGS. 2A and 2C. Control of the ratio of currents in coil pair 120 versus third coil 160 by a microprocessor controller 165 or similar controller associated with at least one of the power supplies can also be used to affect the heating uniformity. In an actual anti-icing application, absolute uniformity may not be desirable. For example, the maximum heat transfer to the ambient is typically along the nose line of the leading edge and decreases away from the nose line. The actual heat transfer distribution will in general depend on vehicle relative velocity and angle of attack to the air stream. Using the current control described above, the heating of the susceptor can be adjusted to match the expected heat transfer rate to the ambient.

Figure 3:
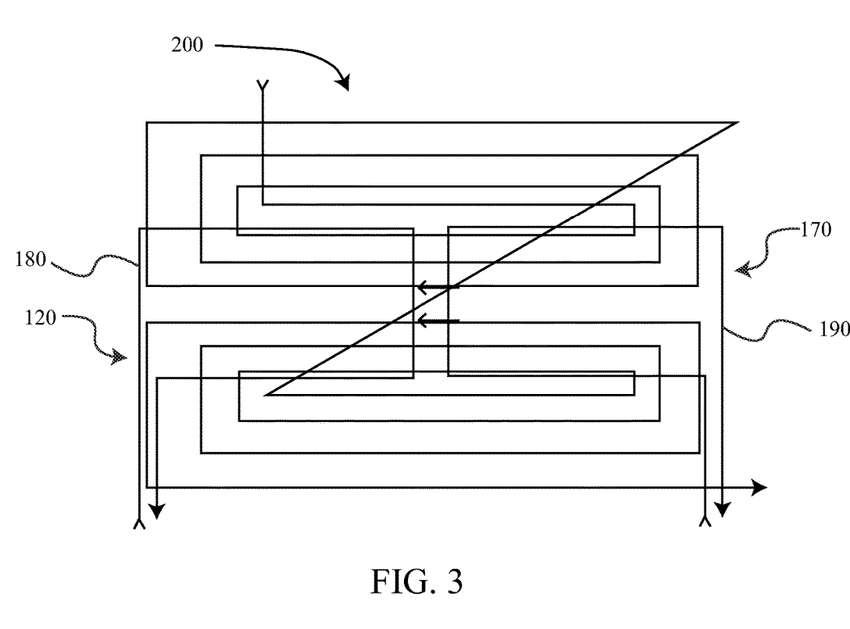
FIG. 3 is a schematic view of a pair of induction heating coils with a pair of compensating coils for uniform heating.

The null-flux linkage with the coil pair 120 may also be achieved with multiple coils and multiple layers of coils. For example, the compensating coil, third coil 160 in FIG. 2A, could instead be second coil pair 170, consisting of left coil 180 and right coil 190, as shown in FIG. 3. A third coil layer, powered by a third independent power supply could also be added on top of the second coil layer formed by the second coil pair 170. Instead of a coil pair, three or more coils could comprise a coil layer.

While described for embodiments having a coil pair for substantially symmetrical heating of a surface such as a wing leading edge, a single coil for inductive heating will have a similar cold spot and a compensating coil with net-zero flux geometry relative to the single coil may be employed to provide uniform heating of the cold spot.

Figure 4A:
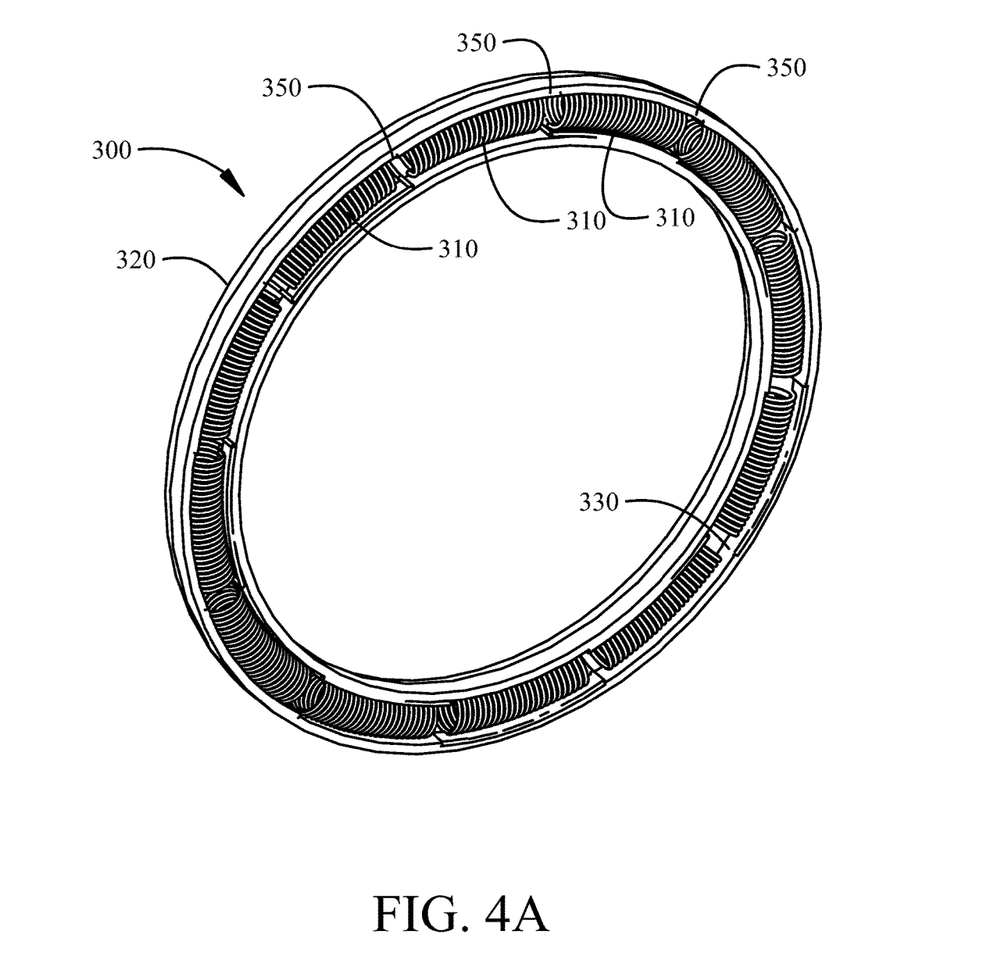
FIG. 4A is a rear pictorial view of an induction heating system using solenoid coils for a nacelle leading edge.
Figure 4B:
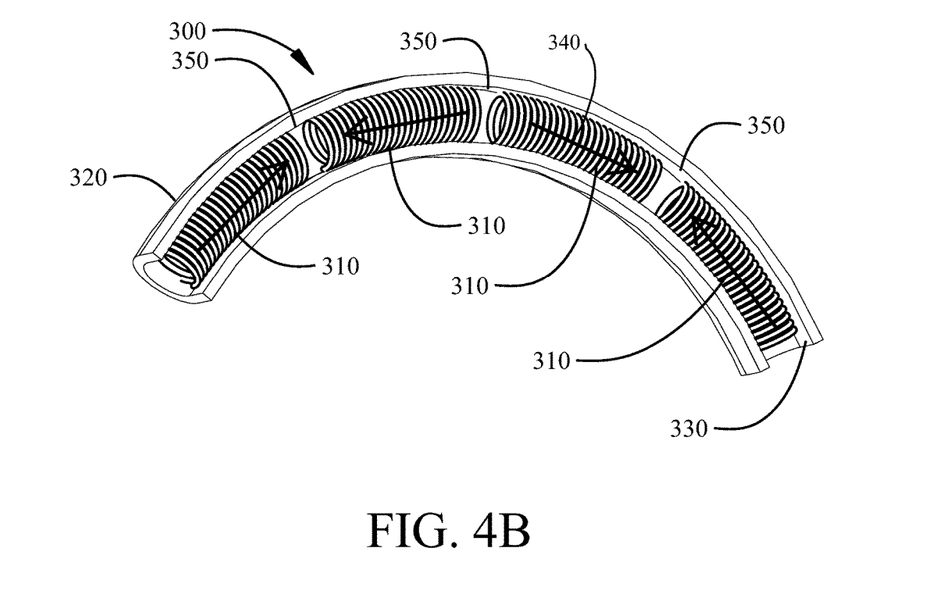
FIG. 4B is a partial detailed view of the solenoid coil induction heating system of FIG. 4A.

In addition to the spiral-pancake coil geometry, the null-flux geometries to improve uniform heating can be implemented in an embodiment employing toroidally wound segmented solenoid coil windings such as those that might be used to provide anti-icing to the nose cowl of an engine nacelle. The basic induction-heating system 300 for nose-cowl anti-icing using such solenoid coils is shown in FIG. 4A. As shown in detail in FIG. 4B, the coils consist of a set of segmented solenoids 310, wound toroidally and placed inside the nose cowl 320. In FIGS. 4A and 4B, coil wire diameter has been exaggerated for better visualization. The solenoids 310 could be wired together in series, parallel, or a combination of series and parallel. The nose cowl 320 is shown thicker than would be necessary for an erosion shield since hollow passages are often used in the nose cowl to reduce noise. The susceptor 330, which in the embodiment show is also the erosion shield, covers the nose cowl 320. The direction of the magnetic flux inside the solenoids is designated by the arrows 340. As can be seen in FIG. 4, the polarization of the solenoids alternates around the circle of coil segments. This configuration efficiently heats the susceptor 330, however, it produces cold spots 350 on the susceptor where the tangential magnetic flux from adjacent solenoids cancels.

Figure 5:
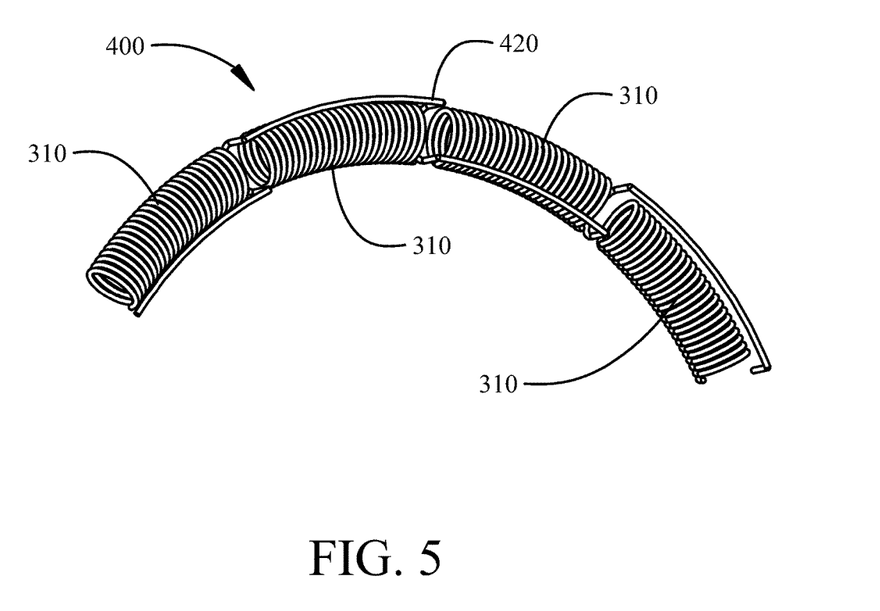
FIG. 5 is a partial detailed view of the solenoid coils with an associated compensation coil; and, FIG. 6 is a flow chart of a method for uniform induction heating for deicing and anti-icing flight surfaces on an aircraft implementing the disclosed embodiments.

An extra coil providing a net-zero flux geometry relative to the solenoids is employed as a compensating coil for eliminating the cold spots in this type of configuration is shown in FIG. 5. In FIG. 5 the nose cowl is not shown for better visualization. In addition to the segmented solenoids 310, a meander coil 420, acting as the compensating coil, is placed in induction heating system 400. The meander coil 420 provides a coil loop intermediate each adjacent pair of solenoids 310 and provides tangential magnetic flux at the cold spots of the segmented solenoids 310. Analogous to the case with the spiral pancake coils, the meander coil 420 is powered from a different power supply than is the segmented solenoids 410. Further, the net magnetic flux from the solenoids that threads through the meander coil is essentially zero, so there is no interference between the two independent power supplies.

Figure 6:
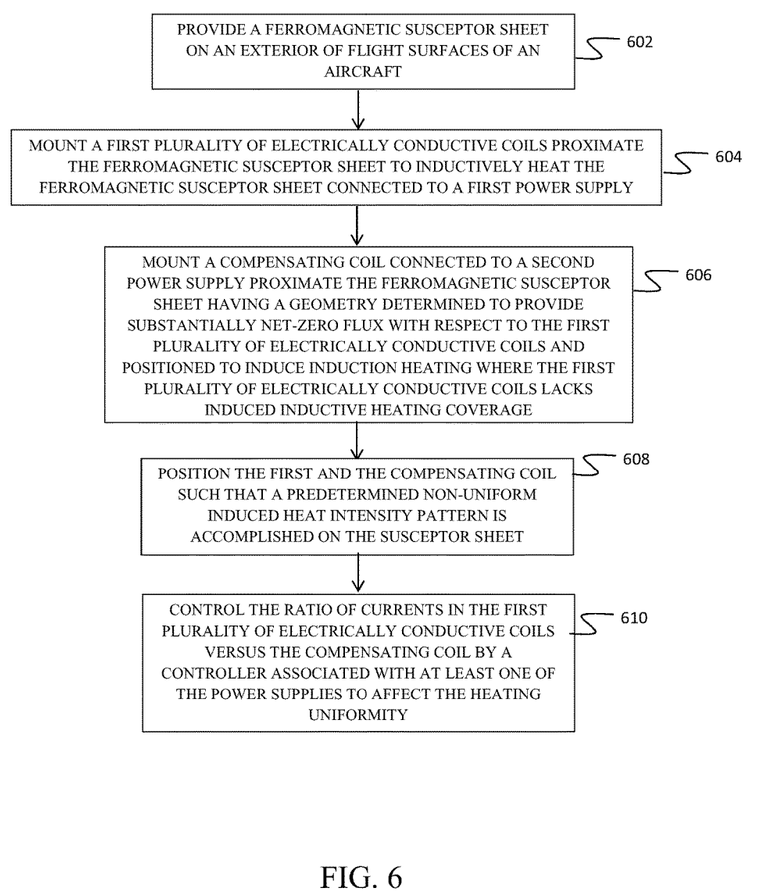

As shown in FIG. 6, the embodiments described provide a method for uniform induction heating for deicing and anti-icing flight surfaces on an aircraft. A ferromagnetic susceptor sheet is provided on an exterior of flight surfaces of an aircraft, step 602. A first plurality of electrically conductive coils is mounted proximate the ferromagnetic susceptor sheet to inductively heat the ferromagnetic susceptor sheet, step 604. The first plurality of electrically conductive coils powered by a first AC power source with a first frequency. A compensating coil having at least one coil or a second plurality of electrically conductive coils is mounted proximate the ferromagnetic susceptor sheet having a geometry determined to provide substantially net-zero flux with respect to the first plurality of electrically conductive coils and positioned to induce induction heating where the first plurality of electrically conductive coils lacks induced inductive heating coverage, step 606. The second plurality of electrically conductive coils is powered by a second AC power source with a second frequency.

For selected embodiments, the first and the compensating coil or second plurality of electrically conductive coils are positioned such that a predetermined non-uniform induced heat intensity pattern is accomplished on the susceptor sheet, step 608, to accommodate variation in a heat transfer rate pattern from the susceptor sheet to an adjacent ambient resulting from a shape geometry induced air flow pattern on the flight surfaces. Additionally, control of the ratio of currents in the first plurality of electrically conductive coils versus the second plurality of electrically conductive coils by a microprocessor controller or similar controller associated with at least one of the power supplies can to affect the heating uniformity, step 610.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. An induction heating system comprising:
    a ferromagnetic susceptor mounted proximate an exterior of flight surface of an aircraft;
    at least one electrically conductive spiral pancake coil mounted proximate the ferromagnetic susceptor, said at least one electrically conductive spiral pancake coil powered by a first AC power source with a first frequency; and,
    at least one compensating coil mounted proximate the ferromagnetic susceptor overlaying the at least one electrically conductive spiral pancake coil and having a geometry determined to provide substantially net-zero flux with respect to the at least one electrically conductive spiral pancake coil and positioned to induce induction heating with a portion of the at least one compensating coil aligned over a line segment in the middle of the at least one spiral pancake coil where a field minimum occurs, thereby eliminating a cold spot at the field minimum, said at least one compensating coil powered by a second AC power source with a second frequency adapted to induce average heating by the at least one compensating coil additive to average heating induced by the at least one electrically conductive spiral pancake coil.

2. The induction heating system as defined in claim 1 wherein the at least one electrically conductive spiral pancake coil comprises a first plurality of electrically conductive spiral pancake coils.

3. The induction heating system as defined in claim 2 wherein the at least one compensating coil comprises a second plurality of electrically conductive compensating coils.

4. The induction heating system as defined in claim 2 wherein the first plurality of electrically conductive spiral pancake coils comprises a pair of spiral pancake coils.

5. The induction heating system as defined in claim 4 wherein the pair of spiral pancake coils are symmetric about a nose line and the at least one compensating coil comprises a third coil mounted on top of the spiral pancake coil pair symmetric about the nose line.

6. The induction heating system as defined in claim 2 wherein the at least one compensating coil comprises a second plurality of electrically conductive coils.

7. The induction heating system as defined in claim 6 wherein the first plurality of electrically conductive spiral pancake coils comprises a pair of spiral pancake coils.

8. The induction heating system as defined in claim 7 wherein the pair of spiral pancake coils are symmetric about a nose line and the second plurality of electrically conductive compensating coils comprises a second coil pair mounted on top of the spiral pancake coil pair symmetric about the nose line.

9. The induction heating system as defined in claim 1 wherein the second AC power source comprises a phase adjustment component in series with the at least one compensating coil and connected to the first AC power supply that varies current phase of a third coil randomly in time.

10. The induction heating system as defined in claim 9 wherein the phase adjustment component is selected from a set of a solenoid, a capacitor, or a combination thereof.

11. An induction heating system comprising: a ferromagnetic susceptor mounted proximate an exterior of flight surface of an aircraft; a plurality of segmented solenoids mounted proximate the ferromagnetic susceptor, said plurality of segmented solenoids powered by a first AC power source with a first frequency; and, at least one compensating coil mounted proximate the ferromagnetic susceptor overlaying the plurality of segmented solenoids and having a geometry determined to provide substantially net-zero flux with respect to the plurality of segmented solenoids and positioned to induce induction heating with a portion of the at least one compensating coil providing a coil loop intermediate each adjacent pair of solenoids and providing tangential magnetic flux at the cold spots of the segmented solenoids, said at least one compensating coil powered by a second AC power source with a second frequency adapted to induce average heating by the at least one compensating coil additive to average heating induced by at least one of the plurality of segmented solenoids.

12. The induction heating system as defined in claim 11 wherein the at least one compensating coil comprises a meander coil mounted to provide a coil loop intermediate each adjacent pair of solenoids.

13. A method to provide uniform induction heating for deicing and anti-icing flight surfaces on an aircraft, comprising: providing a ferromagnetic susceptor sheet mounted proximate an exterior of flight surfaces of an aircraft; mounting at least one electrically conductive spiral pancake coil proximate the ferromagnetic susceptor to inductively heat the ferromagnetic susceptor, said at least one electrically conductive spiral pancake coil powered by a first AC power source with a first frequency; and mounting at least one compensating coil proximate the ferromagnetic susceptor overlaying the at least one electrically conductive coil and having a geometry determined to provide substantially net-zero flux with respect to the at least one electrically conductive coil and positioned to induce induction heating with a portion of the at least one compensating coil aligned over a line segment in the middle of the at least one spiral pancake coil where a field minimum occurs, thereby eliminating a cold spot at the field minimum, said one compensating coil powered by a second AC power source with a second frequency adapted to induce average heating by the at least one compensating coil additive to average heating induced by the at least one electrically conductive spiral pancake coil.

14. The method as defined in claim 13 wherein the at least one compensating coil comprises a plurality of electrically conductive coils.

15. The method as defined in claim 13 wherein the flight surfaces of the aircraft comprise a leading edge of the wing or engine cowling.

16. The method as defined in claim 13 wherein the second AC power source comprises an electronic circuit in series with the at least one compensating coil, said electronic circuit comprising a solenoid, a capacitor, or a combination thereof connected to the first AC power source and providing a current phase variation in the second plurality of electrically conductive coils in comparison to the current phase in the first plurality of electrically conductive coils.

17. The method as defined in claim 14 wherein the first plurality of electrically conductive spiral pancake coils and the second plurality of electrically conductive coils are positioned such that a predetermined non-uniform induced heat intensity pattern is accomplished on the susceptor sheet to accommodate variation in a heat transfer rate pattern from the susceptor sheet to an adjacent ambient resulting from a shape geometry induced air flow pattern on the flight surfaces.

18. The method as defined in claim 14 further comprising controlling a ratio of currents in the first plurality of electrically conductive spiral pancake coils versus the second plurality of electrically conductive coils to affect uniformity of heating by the first plurality of electrically conductive spiral pancake coils and the second plurality of electrically conductive coils.

19. The method as defined in claim 18 wherein the step of controlling the ratio of currents is accomplished with a microprocessor controller associated with at least one of the power sources.

20. The induction heating system as defined in claim 12 wherein the segmented solenoids are wound toroidally and placed inside a nose cowl.

* * * * *